United States Patent [19]

Drohan et al.

[11] 3,715,594
[45] Feb. 6, 1973

[54] SPACE VEHICLE SYSTEM FOR DETERMINING EARTH'S ULTRAVIOLET RADIATION LIMB

[75] Inventors: William A. Drohan, Bedford; Juri Vaige, Chelmsford; David A. Warner, Cambridge, all of Mass.

[73] Assignee: The United States of America as represented by the Secretary of the United States Air Force

[22] Filed: Aug. 27, 1969

[21] Appl. No.: 853,549

[52] U.S. Cl..............250/83.3 UV, 250/71, 250/203, 356/251
[51] Int. Cl..................................................G01t 1/16
[58] Field of Search..250/71, 83.3 UV, 203; 356/251

[56] References Cited

UNITED STATES PATENTS

| | | | |
|---|---|---|---|
| 3,175,089 | 3/1965 | Tulley et al. | 250/203 |
| 3,201,591 | 8/1965 | Froelich et al. | 250/203 X |
| 3,230,376 | 1/1966 | Goetze et al. | 250/203 |
| 3,519,823 | 7/1970 | Heller et al. | 250/203 X |
| 3,524,710 | 8/1970 | Rickert | 356/251 |

*Primary Examiner*—Benjamin A. Borchelt
*Assistant Examiner*—N. Moskowitz
*Attorney*—Harry A. Herbert, Jr. and Willard R. Matthews, Jr.

[57] ABSTRACT

An optical system is used to scan the earth's horizon and project an image from which position information is derived for use in a space vehicle navigation control system. The image is projected onto a camera tube target through ultraviolet filters. The system thus utilizes the earth's ultraviolet radiation limb as an earth-space boundary reference. A radioactive reference graticule is positioned in contiguous relationship with the camera tube target to provide both target intensity calibration and a spatial check of the optical image.

1 Claim, 2 Drawing Figures

SPACE VEHICLE SYSTEM FOR DETERMINING EARTH'S ULTRAVIOLET RADIATION LIMB

BACKGROUND OF THE INVENTION

This invention relates to space vehicle navigation systems and in particular to means for determining the spacecraft's relationship to the center of the earth from earth-space boundary information When a space vehicle is in such close proximity to the earth that it cannot be considered a point source for navigational purposes, then positional information can be obtained by scanning the earth's horizon and establishing at least three reference points. A coordinate computer can from such information determine the earth's center and the space vehicle's relationship to it. Systems of this type are well known. U.S. Pat. No. 3,246,160, Photosensitive Horizon Scanner For Space Vehicle, issued Apr. 12, 1966 to J. S. Zuckerbraun, discloses such a system in detail. The earth's limb (or horizon, as it appears visually) does not provide information that is precise enough for all navigational purposes, however. This is due to cloud cover, light wave aberrations, earth albedo, and the scattering of solar energy in the earth's atmosphere. Attempts have therefore been made to develop navigational systems based upon the detection of some phenomenon having a known directional aspect with respect to earth. In this regard the infrared limb (or detected spherical shell coinciding with the earth's horizon at infrared frequencies) has been used in the past. Infrared radiation is thermal radiation originating in the thermal energy of the earth itself and its surrounding atmosphere. It is essentially independent of the relative position of the sun due to the diurnal stability of thermal processes in the atmosphere. It has been an attractive reference for satellite attitude control systems because of the continued need for local vertical information. The infrared limb, however, is affected by the temperature of the earth's surface and the various atmospheric layers, and by the absorption of water vapor and carbon dioxide in the atmosphere. Furthermore, the wavelength gradient over the infrared band is not sharp enough to provide the very narrow band of descrete detectable radiation required for an accurate navigational reference.

The above review of the state of the art indicates that there currently exists a need in the field of satellite navigation for a planet-space boundary reference that can be more sharply defined than visual and infrared planet limbs. There of course also exists a need for apparatus capable of detecting such a reference. The present invention is directed toward solving these and other problems.

SUMMARY OF THE INVENTION

It is a basic concept of the invention to utilize the earth's ultraviolet limb as an earth-space boundary reference. By means of theoretical study and direct measurements it has been determined that an ultraviolet radiation detector situated outside the earth's atmosphere and operating within a 2,400 A to 2,700 A range will see only a very narrow ring of light at an apparent altitude of approximately 61 km. The ultraviolet air glow in this spectral range is considerably less intense than the limb and the radiance peak is unique in that there exists no secondary peaks and no spurious meteorological features. Furthermore, the altitude of the peak remains essentially constant over a wide range of scattering angles and is vertically unaffected by meteorological variables and changes in tropospheric and stratospheric compositions.

The present invention comprises a novel system adapted to detect the earth's ultraviolet limb and extract therefrom satellite positional information for use in the satellite navigation system. In essence the system comprehends the combination of an image forming optical subsystem, ultraviolet filters and a camera tube of the vidicon type. The optical subsystem includes a scanning mechanism that permits scanning of the earth's horizon. The image formed by the optical subsystem is projected through the ultraviolet filters onto the target of the camera tube. The camera tube scan circuit generates signals when the ultraviolet limb image appearing on the target is crossed by the tube's scanning beam and such signals are delivered to a coordinate computer for processing. A spatial check of the optical image as well as a reference for absolute sensitivity of the camera tube target is also provided in the system by the inclusion of a novel radioactive reference graticule located in the vicinity of the camera tube target.

It is a principal object of the invention to provide a satellite navigation system that utilizes the ultraviolet limb as an earth-space boundary reference.

It is another object of the invention to provide a satellite navigation system that is simpler, more reliable and more accurate than existing systems.

It is another object of the invention to provide a system for detecting the earth's ultraviolet radiation limb and extracting satellite position information therefrom.

It is another object of the invention to provide in a system for detecting the earth's ultraviolet radiation limb, a radioactive reference graticule adapted to provide a spatial check for optical images and a sensitivity reference for the system camera tube target.

These, together with other objects, features and advantages of the invention will become more readily apparent from the following detailed description when taken in conjunction with the illustrative embodiments in the accompanying drawings.

DESCRIPTION OF THE PREFERRED EMBODIMENT

Figure 1:
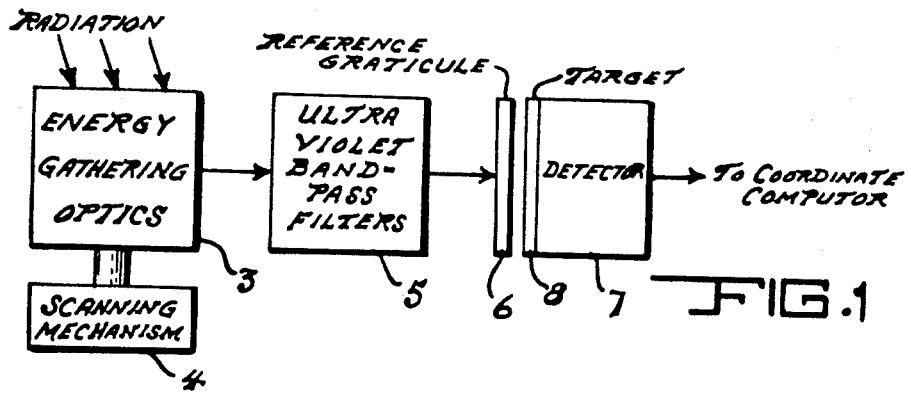
FIG. 1 is a block diagram of the preferred embodiment of the invention.

The major component parts of the invention are illustrated in block diagram form in FIG. 1. Although the concept of an ultraviolet earth limb detecting system and the particular combination or arrangement of component parts of the system herein disclosed are novel, the individual elements and circuits that comprise the system are known and commercially available. Consequently, considerable latitude is possible in the actual engineering design of such a system. The energy gathering optics system 3, for instance, can be of any appropriate optical design. For instance, it may be a narrow angle system with maximum scanning angle effected by scanning mechanism 4 or it may be a wide angle optics system with no scanning whatever. The choice of ultraviolet band pass filter 5 may also be dictated by particular design constraints and applications. Operation of the system in the ultraviolet band between 2,400 A and 2,700 A has been determined to be particularly effective. However, filters defining any other range within the ultraviolet band are also with the scope of the invention and may be preferable for some applications.

In operation radiant energy enters the energy gathering optics system 3, passes through filter 5 and is projected on the photosensitive target 8 of detector 7. Detector 7 scans its target 8 with a line nominally in the direction perpendicular to the horizon. This is also the maximum gradient for spatial distribution of radiant energy. The output signal of detector 7 is then a record of energy versus time. As long as the scanning of the phenomenon is performed linearly with time, a record is also obtained of energy observed as a function of scanned angle. This information can be stored on a storage tube and subsequently transmitted to a telemetry station or it can be delivered to the satellite navigation system coordinate computer for processing.

Figure 2:
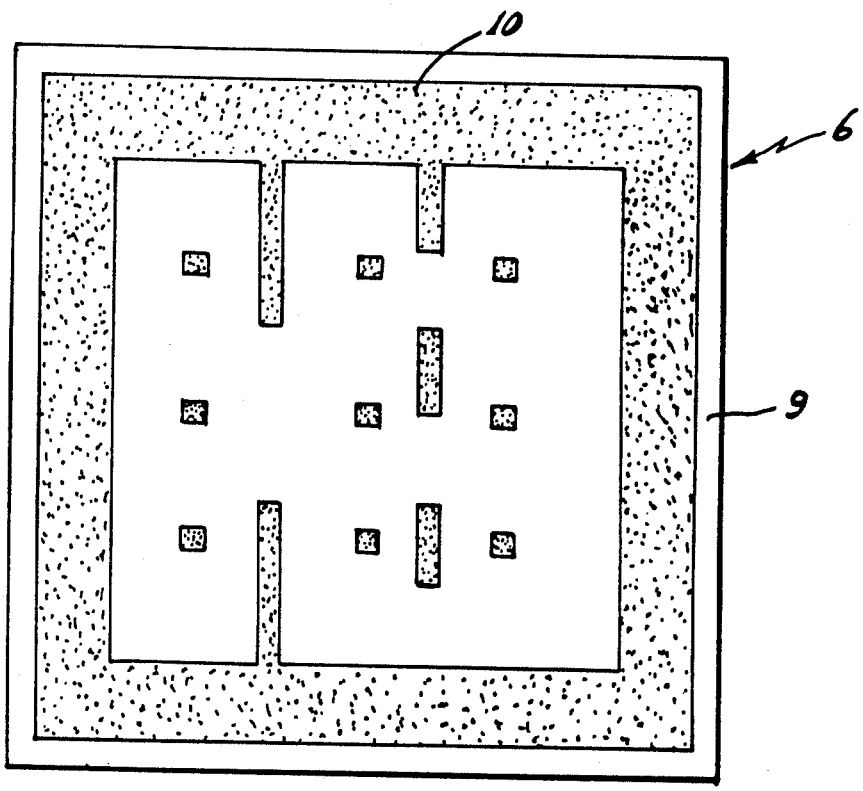
FIG. 2 is a plan view of the radioactive reference graticule of the invention.

Spatial and intensity calibration for the system is provided by reference graticule 6. The graticule consists of a thin suprasil quartz plate 9 having a discrete pattern 20 etched onto one surface as illustrated in FIG. 2. The etched surface is coated with a long half-like radioactive material mixed with phosphor. The radioactive material emits low energy particles that are sufficient to activate the phosphor. The pattern 10 can be of any arbitrary configuration and conveniently is such that large areas occur at filter junctions and around edges not used. Graticule 6 is positioned in the immediate proximity of target 8 and emits radiant energy to the target. If a scan of an entire frame over the target place is made, the pattern gives information of absolute sensitivity of the target over its entire area regardless of amplifier power supply change. It also provides a check spatially since the optical system is fixed and so is the pattern. Therefore, if the electronic scan amplitude or linearity varies, the output signal containing information from the pattern shows the presence of variation, and quantitatively measures it.

While the invention has been described in its preferred embodiment it is understood that the words which have been used are words of description rather than words of limitation and that changes within the purview of the appended claims may be made without departing from the true scope and spirit of the invention in its broader aspects.

What is claimed is:

1. In combination with a satellite navigation system, means for detecting the earth's ultraviolet radiation limb and extracting satellite position information therefrom comprising:

image forming optical means,
   means for scanning said image forming optical means,
   ultraviolet bandpass filter means adapted to pass radiant energy having wavelengths of not less than 2,400 A and not more than 2,700 A,
   detector means having a target responsive to radiant energy, said optical means and said filter means being arranged to provide ultraviolet filtering of images formed by said optical means and to display said filtered images on said detector target, and
   a reference graticule in contiguous relationship to said detector target, said reference graticule consisting of a quartz plate having a discrete pattern of long half-life radioactive material mixed with phosphor disposed thereon.

* * * * *